3,217,838
ENERGY ABSORBING DEVICE
Vincent C. J. Peterson, Huntingdon Valley, Pa., and William J. Gilmore, Manitou Beach, Mich., assignors to American Chain & Cable Company, Inc., New York, N.Y., a corporation of New York
Filed Mar. 4, 1963, Ser. No. 262,543
3 Claims. (Cl. 188—1)

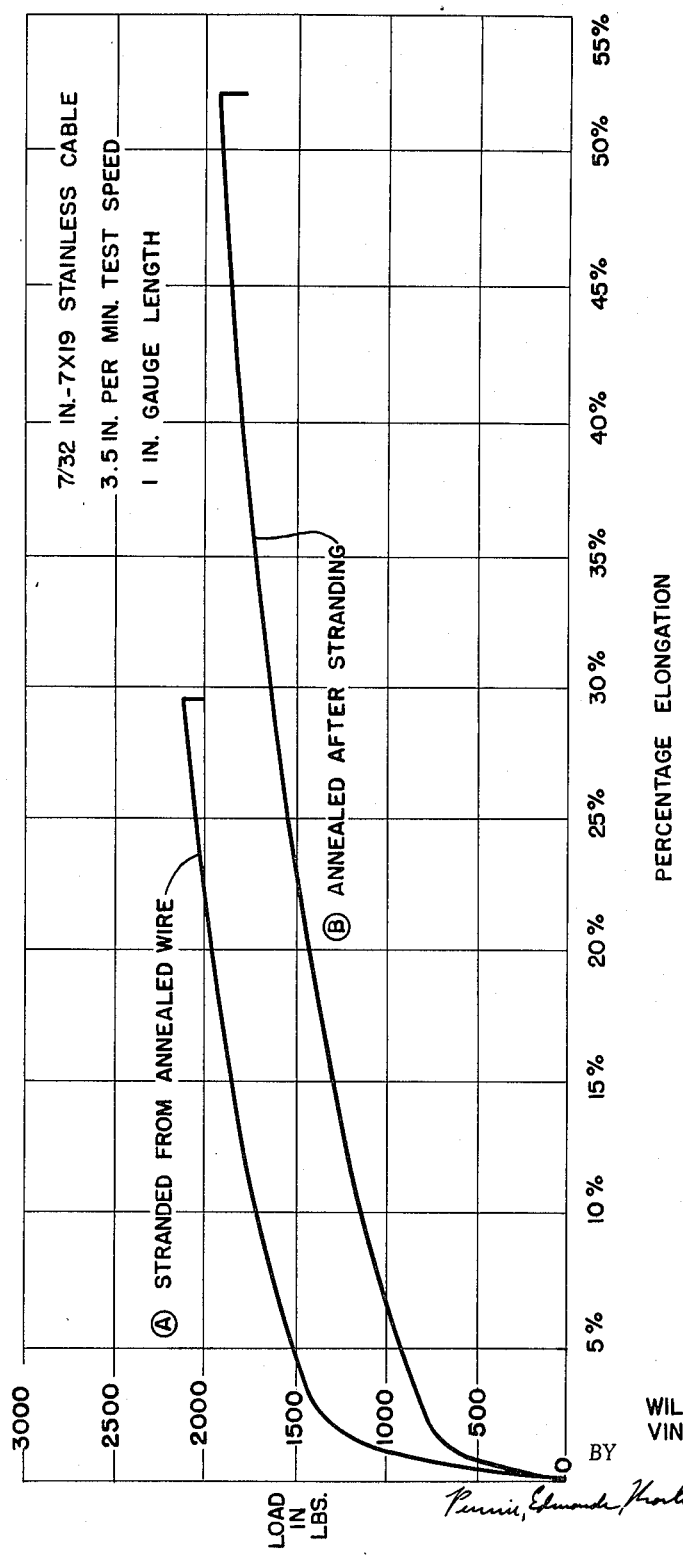
FIG. I
INVENTORS
WILLIAM J. GILMORE
VINCENT C. J. PETERSON
BY
ATTORNEYS Nov. 16, 1965   V. C. J. PETERSON ETAL   3,217,838
ENERGY ABSORBING DEVICE
Filed March 4, 1963   2 Sheets-Sheet 2
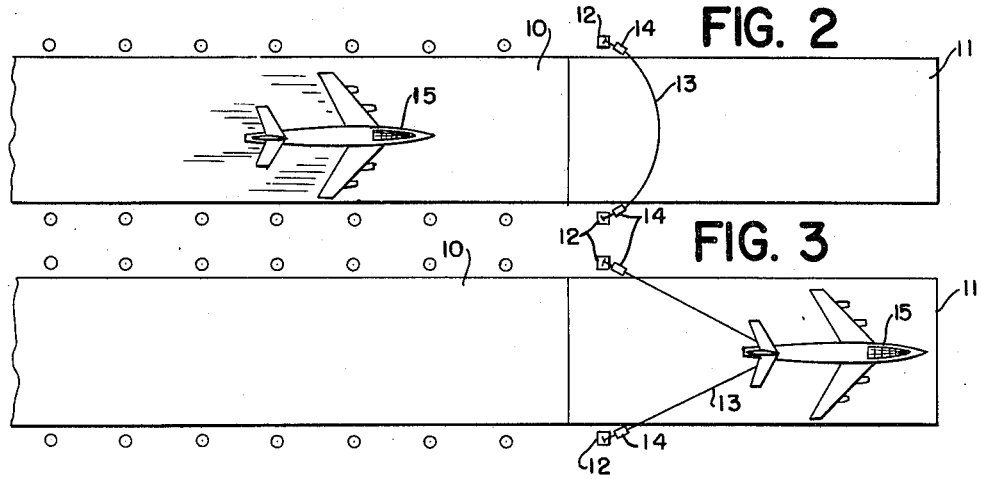
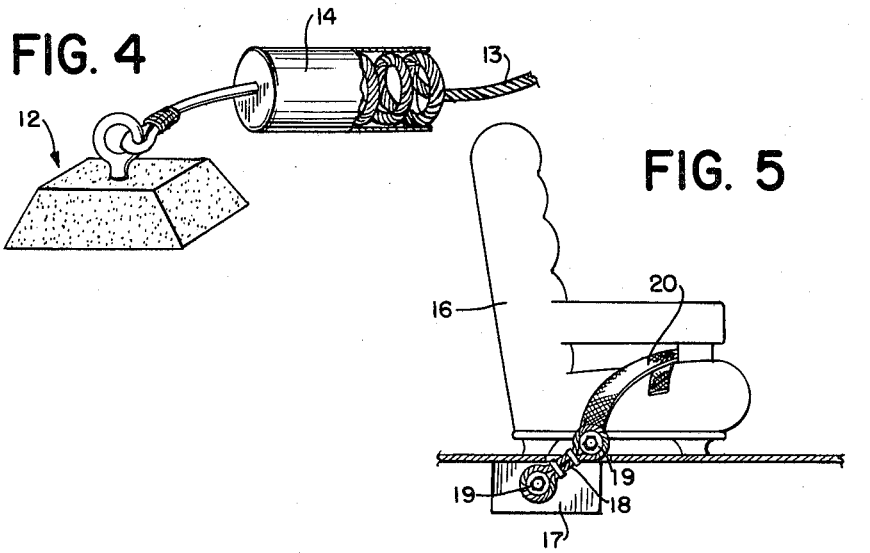
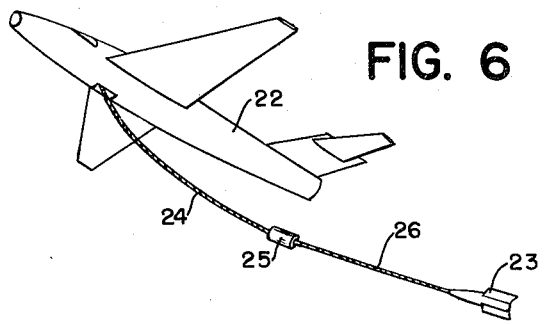
INVENTORS
WILLIAM J. GILMORE
VINCENT C.J. PETERSON
BY
ATTORNEYS United States Patent Office 3,217,838
Patented Nov. 16, 1965

This invention relates to devices for absorbing energy and more particularly to an impact energy absorbing device and its method of manufacture characterized by a helically stranded cable in the fully annealed condition capable of elongating under tensile impact to absorb substantial kinetic energy.

Though the new energy absorbing device has a wide variety of uses, several of which are discussed hereinafter, its application to aircraft arresting equipment is particularly apt for general description of the invention. Aircraft arresting gear often consists of a plurality of cables or ropes laid transversely across the end of a runway to be engaged by a hook on aircraft which have overshot the runway on landing or experienced a power failure on takeoff. Common stranded wire cable associated with dampening means has sometimes been employed for this purpose but for greater resilient elongation resort has often been had to nylon or other fiber rope. When non-metallic rope is used, or when wire cable is associated with hydraulic or other forms of auxiliary force-dampening mechanisms, the maximum tensile strength of the arresting gear is sacrificed in order to improve energy absorption and the elastic resiliency of such equipment possesses an undesirable "bounce-back" effect on the aircraft. Metal wire cable which itself can be plastically elongated to absorb energy would be an improvement over these other forms of arresting gear, but no successful adaptation of such metal cable has been made heretofore because of the limited extensibility under impact of its stranded construction.

In experimenting with several forms of wire cable for energy absorbing devices such as aircraft arresting gear, we have discovered that an extraordinary improvement in the percentage of elongation of stranded metal cable can be achieved by annealing the cable after stranding so as to eliminate work-hardening of the wires which unavoidably occurs during stranding and spooling. Comparative tests have shown that the work-hardening produced from stranding wire into helically twisted cable is relatively severe even though the individual wires have been fully annealed prior to stranding. It is the stranding and spooling steps themselves which give rise to the work-hardening, and in accordance with present invention those disadvantages are overcome by annealing the cable subsequent to the stranding operation. Consequently, the new device for absorbing impact energy comprises load-receiving means and anchorage means along with a length of stranded cable interconnecting the load-receiving and anchorage means. This cable comprises a plurality of helically stranded metal wires in the fully annealed condition capable of elongating under tensile impact to absorb substantial kinetic energy. The method contemplated by the invention, which is of equal importance to the present development, provides a sequence of steps for making this cable capable of elongating under tensile impact to absorb substantial kinetic energy. The steps comprise helically stranding a plurality of metal wires together into a length of twisted cable, and thereafter annealing the cable to eliminate work-hardening of the wires resulting from the stranding step.

The present invention is of benefit to a wide variety of energy absorbing devices which heretofore have used fiber or other non-metallic strands, or metal wire rope at least partially work-hardened by stranding and therefore associated with auxiliary force-dampening means. Non-metallic extensible elements have a distinct maximum limit in tensile strength and they produce "bounce-back" due to their elastic resiliency, which makes them unsatisfactory for arresting objects of great mass which move at high velocities such as large airplanes. Ordinary wire rope not annealed after stranding pursuant to this invention is also inferior for energy absorption purposes because its relatively low percentage of elongation induced by work-hardening during stranding virtually cancels whatever advantage is gained by its higher tensile strength.

Preferred embodiments of the invention are described hereinafter with reference to the accompanying drawings, wherein FIG. 1 is a stress-strain curve illustrating the marked advantage in annealing the strands of a wire cable subsequent to the stranding operation;

FIGS. 2 and 3 illustrate the new energy absorption device employed as aircraft arresting gear;

FIG. 4 is an enlarged perspective view partly broken away of a package containing part of the new cable in coiled form prior to use;

FIG. 5 illustrates the new energy absorption device adapted to an aircraft seat installation for passenger safety; and FIG. 6 illustrates the new energy absorption cable adapted to a target towing assembly.

In one example of the new method of making the energy absorbing cable of the invention, a number of wires of austenitic stainless steel were heated to the full annealed condition. (Depending on the intended use of the cable, other alloys such as chrome manganese steel may be employed to advantage.) These wires were then stranded and closed into a 1 x 19 cable of one-eighth inch diameter. After stranding, the cable was bright annealed in an atmospheric controlled tube furnace to eliminate the work-hardening which had occurred during the stranding operation.

Comparative tests were conducted to ascertain the difference in energy absorbing ability between the above-described 1 x 19 cable of one-eighth inch diameter and a counterpart of it which was identical in all respects except that it was in the full hard drawn condition and was not annealed after stranding. The sample according to the invention which had been annealed after stranding had a rated breaking strength of 1000 lbs. When a 100-lb. weight was dropped ten feet (1000 ft.-lbs. of kinetic energy) on a six-foot section of this sample, the kinetic energy was absorbed by the cable and the 100-lb. mass was brought to rest with failure. The hard drawn sample which was not annealed after stranding had a rated breaking strength of 1760 lbs., and yet every time the 100-lb. weight was dropped ten feet on a six-foot section of its length failure occurred. This establishes that an energy absorbing cable made in accordance with the invention is capable of dampening far more tensile impact than its conventional counterpart even though its ultimate tensile strength is substantially less.

In view of the discussion hereinafter of the applicability of this invention to aircraft arresting gear, it is of interest that the crushing effect of an arresting gear hook on the new cable does not appreciably lower its tensile strength on energy absorption properties. This was confirmed by tests simulating the crushing which occurs when an arresting gear hook engages the cable. Most probably, the absence of adverse effect on the tensile strength and energy absorption ability is due to a certain work-hardening effect in the deformed area.

In another compartive test, a one-foot length of 1 x 19 cable of one-eighth inch diameter, which was typical aircraft stainless cable in the full hard drawn condition, failed at 60 ft.-lbs. of impact although rated at 2000 lbs. ultimate tensile strength. One foot of similar cable annealed after stranding pursuant to the invention was rated only at 1000 lbs. ultimate tensile strength but it absorbed 360 ft.-lbs. of impact energy without failure.

A graphic illustration of the increase in energy absorption made possible by the present invention is set forth in FIG. 1 of the drawings. This shows two stress-strain curves A and B indicating the performance of a 7 x 19 austenitic stainless steel cable of seven thirty-second inch diameter and one inch gauge length which was tested at a speed of 3.5 inches per minute. The test sample of curve A was stranded from annealed wire in accordance with conventional practice and the test sample of curve B was annealed after stranding pursuant to this invention. The sample A stranded from annealed wire failed at approximately 2100 lbs. load after its one inch gauge length elongated 29.5%. The area under the curve A is the measure of energy absorbed by this test sample during the test. The sample B annealed after stranding failed at about 1900 lbs. load after its one inch gauge length had elongated approximately 52%. Again the area under the curve shows the amount of energy absorbed by the cable, and it is quite evident from the FIG. 1 graph that the sample B annealed after stranding in accordance with this invention absorbed far more energy before breaking than did the sample A.

Turning now to FIGS. 2 to 4, a schematic illustration is given of the application of the new energy absorbing device to aircraft arresting gear. In FIG. 2, an end portion 10 of an ordinary runway is extended by an emergency strip 11. On opposite sides of the emergency strip 11 are one or more pairs of anchorage posts 12 shown in more detail in FIG. 4. A respective number of lengths 13 of the new energy absorbing cable, which have been fully annealed subsequent to stranding, interconnect each pair of anchorage posts 12. In order to make available a substantial amount of slack in the cable length 13, and also to store the greater part of that slack length when the cable is not in use, one or more packages 14 may be included on the cable 13 to contain a number of its coils. The package or canister 14 may be of rupturable construction so that it presents little resistance to discharge of the cable coils when they are pulled from it. In use, the cable 13 is disposed across the emergency strip 11 as shown in FIG. 2 so that if an aircraft 15 develops power failure on takeoff or overshoots during landing a hook beneath its fusilage may engage the cable 13 as shown in FIG. 3. When this happens, the energy absorbing cable 13 is pulled out of the packages 14 and is subjected to tensile impact by the kinetic energy of the moving aircraft when all of its slack is taken up. If the cable is long enough between the anchorage posts 12, a vast amount of kinetic energy may thus be absorbed as the annealed cable elongates under tension and as a result of the aircraft is brought to rest before reaching the end of the emergency strip 11.

Another example of the use of the new energy absorbing device for aircraft is shown in FIG. 5. Here, a passenger seat 16 is anchored to the frame 17 of the aircraft principally by a coupling of the new energy absorbing cable 18. Suitable fasteners 19 on the seat and the aircraft frame serve as anchorage means for the opposite ends of the coupling 18. Also the passenger's safety belt may be anchored to the coupling 18. In the event of an emergency landing, the sudden impact urges the seat 16 and its passenger forwardly to strain the coupling 18 and absorb substantial kinetic energy. This lowers the deceleration on the passenger and in some circumstances can prevent or reduce bodily injuries. Another representative use for the energy absorbing device of the invention is illustrated in FIG. 6 where an aircraft 22 pays out behind itself a tow target 23 by means of a tow cable 24. The target of course falls away beneath the aircraft 22 as the tow cable 24 is discharged, but when the full length of the cable is payed out the target is brought back up to the aircraft's altitude and speed with great tensile impact. Under these circumstances it is of considerable benefit to attach a package 25 (such as the package 14 described previously) to the end of the tow cable 24 so that much of the impact from the target may be absorbed by elongation of a length of energy absorbing cable 26 of the type contemplated by this invention.

In addition to helically stranded cable, the invention provides a beneficial increase in the energy absorption properties of other multi-wire cables as well. For example the novel after-annealing step may be carried out on braided wire cable or cable having straight wires laid parallel to one another.

There are other widely varying applications for the new energy absorbing device. It may, for example, find use in landing tripods for space capsules where impact of landing could be reduced by elongation of energy absorbing support cables. Similarly, it may be employed for mid-air pick-up of capsules by flying aircraft. A special rigging relying upon the new cable may be used in parachute drop packages to reduce ground impact forces. In all of these applications, the new cable affords the highest possible absorption of kinetic energy because of the crucial annealing after the stranding operation, with the result that masses can be decelerated at the lowest possible rate with very little of the "bounce-back" which would occur if the cable were merely elastically and not plastically deformed.

We claim:
1. In a device for absorbing impact energy which includes load receiving means and anchorage means, a cable interconnecting said load receiving and anchorage means comprising a plurality of metal wires in a helically stranded fully annealed condition capable of elongating under tensile impact in excess of the yield point of the wires to absorb substantial kinetic energy.

2. A device according to claim 1 wherein said metal wires are of stainless steel.

3. A device according to claim 1 which further includes a rupturable package containing at least part of the length of the cable in coiled form prior to application of tensile impact during use.

References Cited by the Examiner

UNITED STATES PATENTS

| 1,864,338 | 6/1932 | Burd | 57—166 |
| 2,071,709 | 2/1937 | Riddle | 57—166 |
| 2,156,294 | 5/1934 | Kessenich. | |
| 2,682,931 | 7/1954 | Young | 188—1 |
| 2,979,163 | 4/1961 | Van Zelm et al. | 188—1 |

FOREIGN PATENTS

| 131,450 | 8/1919 | Great Britain. |

ARTHUR L. LA POINT, *Primary Examiner.*

DUANE A. REGER, *Examiner.*